United States Patent [19]

Vrolyk et al.

[11] 4,058,234
[45] Nov. 15, 1977

[54] SYSTEM FOR SEALING AND REPAIRING LEAKS IN RUPTURED CONTAINERS

[75] Inventors: John J. Vrolyk, Simi; Robert W. Melvold, Northridge, both of Calif.

[73] Assignee: The United States of America as represented by the Administrator, Environmental Protection Agency, Washington, D.C.

[21] Appl. No.: 753,075

[22] Filed: Dec. 21, 1976

Related U.S. Application Data

[62] Division of Ser. No. 582,049, May 25, 1975, Pat. No. 4,012,822.

[51] Int. Cl.² .............................................. B65D 41/10
[52] U.S. Cl. ...................................... 220/239; 138/97; 156/94; 264/36; 264/321; 264/46.6; 428/310; 428/315

[58] Field of Search ................... 156/94; 220/232, 233, 220/239; 428/138, 139, 310, 313, 315, 913; 264/36, 321, 46.6; 138/97

[56] References Cited

U.S. PATENT DOCUMENTS

| 2,170,866 | 8/1939 | McAllister | 220/233 |
| 2,840,262 | 6/1958 | Learmonth et al. | 220/239 |
| 3,764,641 | 10/1973 | Ash | 264/45.2 |
| 3,772,113 | 11/1973 | Patrick | 156/94 |

Primary Examiner—Edward G. Whitby

[57] ABSTRACT

A system for sealing and repairing leaks in ruptured containers whereby an applicator including an open-celled sponge body is inserted into the rupture and the two interacting components of a binary fluid foam composition are mixed and injected into the sponge body, thereby expanding and forming a foam composite with the latter against the rupture to effectively seal and repair same upon curing of the foam in situ.

4 Claims, 4 Drawing Figures

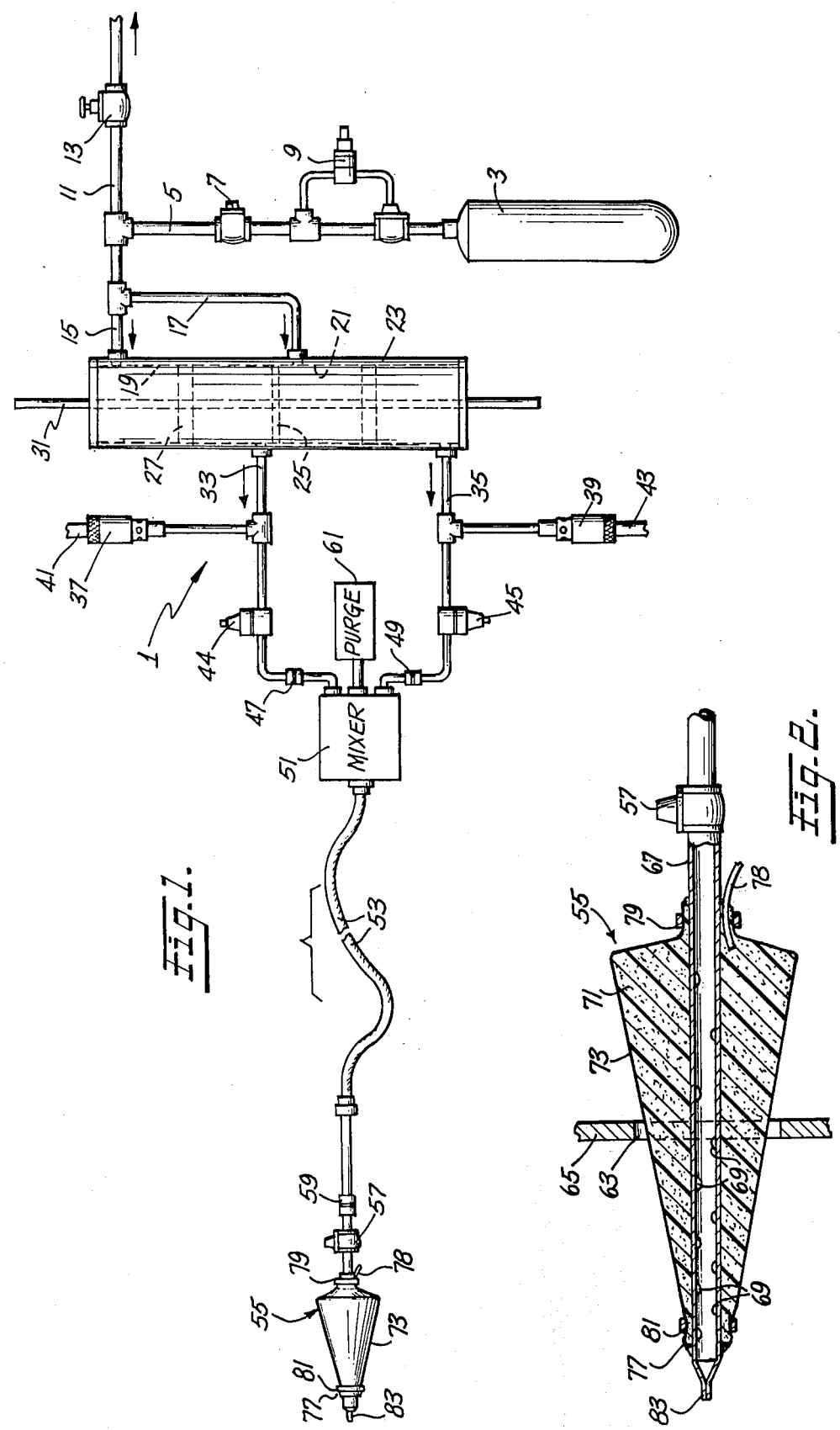

SYSTEM FOR SEALING AND REPAIRING LEAKS IN RUPTURED CONTAINERS

This is a division of application Ser. No. 582,049, filed May 25, 1975 now U.S. Pat. No. 4,012,822.

BACKGROUND OF THE INVENTION

1. Field of the Invention

The present invention relates generally to the plugging or stoppage of leaking fluids from ruptured containers. More particularly, the present invention deals with the effective sealing and repairing of hazardous or dangerous chemical fluid leaks from ruptured or fractured containers utilized for the storing, transporting and dispensing of such chemicals.

2. Description of the Prior Art

In today's highly industrialized society, tremendous quantities of chemicals are continuously being produced, stored and transported to many locations for a variety of uses and applications. Since many of these chemicals are potentially capable of creating environmental and public health hazards, it is apparent that methods and means must be implemented to safeguard the various stages of handling to which any given supply of chemical is inevitably subjected. Of particular danger are chemicals in fluid form which are normally stored and transported in plastic, glass or metallic containers. Many of these fluid chemicals are extremely hazardous if introduced into natural waterways, thereby creating environmental and public health dangers. The likelihood of accidental release to the waterways is obviously increased by the many sequences involved in the production, transferring, shipping, loading and ultimate utilization of these chemicals. Because of the great degree of handling involved, the probability of spilling such chemicals becomes very great.

Generally, the natural spilling of fluid chemicals may occur in a variety of ways. Severe spillage occurs when the container holding the chemical fluid is violently ruptured, with such rupture being accompanied by fire or explosion, thereby permitting large quantities of the fluid to be spilled out almost instantaneously. Less severe spills can result when the container maintains its integrity, but suffers enough damage to allow leakage of the hazardous fluid at a moderate rate. The leaking chemical can enter the waterways either directly, such as in the case of a barge accident or a land-based container falling into the water, or by flowing or being washed into a drainage canal or percolating into the ground water supply.

Countermeasures which neutralize or treat hazardous chemicals that are already mixed and in the waterway may require hours or days to be initiated and involve the very difficult problem of handling large volumes of water. Therefore, a vital need exists for a system which can prevent leaks of hazardous chemicals from ruptured containers by plugging or stopping the leaks emanating therefrom. Such a system should effectively function on land or under water so that a chemical container leak is securely sealed and repaired against any further leakage.

Though the prior art is replete with various methods and means for repairing ruptures and leaks in containers per se, of particular importance are the procedures and means heretofore developed for the specific plugging of leaks in damaged chemical containers. Such developments have included the utilization of rubber and plastic materials as sealing means.

The original approach of using plastic sealants or barriers that would seal leaks and prevent further dissemination of the leaking chemical into a waterway was based on the use of chemical systems, such as polyurethanes, which would be forced into the hole or rupture in the container and expanded to create a seal or barrier. An example of a method utilizing this approach is that disclosed by the Patrick U.S. Pat. No. 3,772,113.

Another approach considered is the use of sealants which do not expand when forced into the hole or rupture, as in the case of the polyurethanes, but rather are already of the proper size and provide suitable adhesion to plug the leaks.

However, the former foaming approach has the advantage that the increase in volume on foaming permits a much tighter seal or barrier for the leak. The basic disadvantage of the foaming may be inhibited or retarded by the chemical ingredients or fluid leaking from the container to be sealed. By contrast, the utilization of a non-expandible sealant overcomes this latter chemical reaction problem, but does not provide a very tight or secure seal.

SUMMARY OF THE INVENTION

The present invention serves to overcome the basic shortcomings and disadvantages of known prior art systems for sealing and repairing leaks in ruptured containers by providing for a system that utilizes an applicator in the form of a porous sponge body connected to a binary fluid foam supply. The sponge body has an interconnected open-celled structure and is provided with an outer layer of material that is substantially inert and impervious to the chemical leaking from the container. The plugging or repairing of the leak is effected by inserting the applicator into the rupture hole and expanding the sponge member and associated outer layer by forcing the interacting components of the binary fluid mixture therein such that effective in situ foaming and curing occurs in the sponge member to form a foam composite, thereby resulting in an effective sealing and repairing of the rupture hole.

It is therefore an object of the present invention to provide for a method which is both simple and economical for the effective sealing and repairing of a container rupture or leak.

It is another object of the present invention to provide a system for repairing a leak or rupture in a container on land or under water.

It is still another object of the present invention to provide a safe system for sealing and repairing the leaking of dangerous chemicals from ruptures in containers for storing same notwithstanding the nature or degree of inherent hazard or danger of such chemicals.

It is still a further object of the present invention to provide a system for repairing leaks in ruptured containers wherein the repair is extremely tight and secure.

It is yet another object of the present invention to provide for a system for plugging and repairing leaks wherein the system is portable and may quickly be brought to any desired location of use.

These and other objects of the present invention will be apparent from the following description and appended claims, reference being made to the accompanying drawings forming a part of this specification wherein like reference characters designate corresponding parts in the several views.

BRIEF DESCRIPTION OF THE DRAWINGS

FIG. 1 is a piping schematic of the system of the present invention;

FIG. 2 is a partial cross-sectional view of the applicator of the present invention as shown inserted within the rupture of a container wall;

DESCRIPTION OF THE PREFERRED EMBODIMENTS

Figure 3:
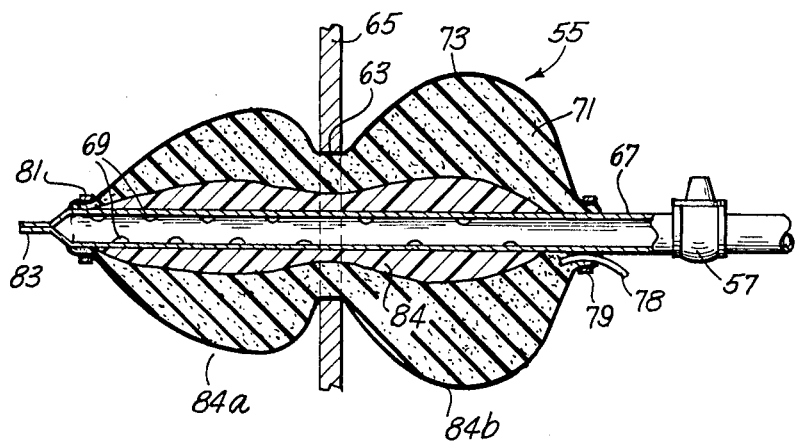
FIG. 3 is a partial cross-sectional view of the applicator of FIG. 2 in an expanded condition.

Referring now to FIG. 1, there is depicted the system 1 of the present invention. Basically, system 1 includes an actuation means 3 in the form of a pressurized gas source or suitable equivalent power means. Gas source 3 may be compressed carbon dioxide from a standard $CO_2$ gas cartridge well known in the art. The gas from source 3 is passed through line 5 under control of on-off valve 7 and pressure regulator 9. Line 5 feeds to line 11 which communicates with the ambient atmosphere through vent valve 13. Line 11 also feeds to separate feed lines 15 and 17 which communicates with separate compartments 19 and 21, respectively, of storage means 23 which may take the form of a cylinder. A fixed wall 25 defines the equal and separate volumes of compartments 19 and 21 within which are disposed pistons 27 and 29, respectively, thereby forming a two-compartment tandem cylinder. A common piston rod 31 secures pistons 27 and 29 for equal and simultaneous displacement. As is evident, piston rod 31 may be actuated by any suitable mechanical or fluid means well known in the prior art. In the embodiment shown, the passage of pressurized gas from source 3 into the upper portions of compartments 19 and 21 from lines 15 and 17, respectively, serve to displace piston rod 31 and its associated pistons 27 and 29 downwardly such that any materials stored beneath the pistons in the lower portions of separate compartments 19 and 21 are simultaneously expelled or displaced in equal volumes out flow lines 33 and 35, respectively.

Disposed in lines 33 and 35 are quick disconnect couplings 37 and 39 for attachment of feeder hoses 41 and 43 which supply the individual binary fluid components through flow lines 33 and 35 into the respective storage compartments 19 and 21. Also disposed in flow lines 33 and 35 are pressure relief valves 44 and 45 which serve to regulate individual flow therethrough only when the pressure drop across each valve exceeds a predetermined set value. Further disposed in line 33 and 35 downstream of relief valves 44 and 45 are quick disconnect couplings 47 and 49 which permit disassembly of the system for purging and cleaning purposes.

As seen, individual components stored in separate compartments 19 and 21, and displaced through lines 33 and 35, ultimately pass to a static mixer 51 which serves to intimately mix and blend the two components for interaction. The mixture is then passed out through line 53 to an applicator 55. Disposed in line 53 are one-way valve 57 for controlling flow of the mixed components into applicator head 55 and a quick disconnect coupling 59 for dismantling the applicator 55 and its associated check valve from line 53 for cleaning purposes. A purge means 61 is disposed in communication with mixer 51 for the purpose of purging the mixer for subsequent operation. Purge means 61 may utilize methylene chloride and gaseous nitrogen for cleaning out the lines upstream of the applicator 55 immediately after use to prevent clogging of the system.

Referring now to FIGS. 2 and 3, there is shown one embodiment of the applicator 55 of the present invention as disposed within a rupture hole 63 of a container wall section 65. Applicator 55 includes a hollow tubular core member 67, the length of which may be varied to provide handle means for safe usage at a distance from dangerous chemical leaks, provided with a plurality of perforations 69 in the wall thereof. Surrounding core member 67 and completely enclosing perforations 69 is a porous sponge body 71 having an open-celled structure. Sponge body 71 may be a reticulated or open-celled polyurethane foam wherein the individual cells are interconnected. However, it is to be understood that any other natural or synthetic open-celled foam or sponge material found suitable for the purpose intended may be utilized for the sponge body 71 in the practice of the present invention. Though sponge body 71 is depicted in FIG. 2 as having a somewhat conical configuration, it may assume any suitable configuration deemed desirable for the particular application in which it is to be utilized. Sponge body 71 is further provided with an outer covering layer 73 which is preferably expandable while at the same time serving as a substantially inert and impervious barrier between sponge body 71 and any chemical material that may be stored within the ruptured container being repaired. It is also desirable that layer 73 become slightly porous upon expansion to permit air trapped in sponge body 71 to escape upon injection of sealant material therein. As seen in FIG. 2, layer 73 may be in the form of a silicone rubber coating which completely envelopes sponge body 71. End portions 75 and 77 of sponge body 71 are securely affixed to core member 67 by means of clamps 79 and 81. Because the end portion 83 of core member 67 is completely sealed, sealant material passing through line 53 and into core member 67 is injected through perforations 69 into the interconnected cell structure of sponge body 71. This latter procedure is more clearly shown in FIG. 3 wherein, because of the pressure under which the sealing material is injected into sponge body 71, the latter expands tightly against the periphery of rupture hole 63, thereby securely sealing same against further leakage of chemical fluid from the interior of ruptured container wall section 65.

Though any suitable unitary or binary foam or sealing composition may be utilized in the practice of the present invention, which suitable sealants include but are not limited to the various urethane foams, polystyrene and polyvinylacetate instant foams, filled and unfilled epoxy systems, polysulfide butyl, neoprene and silicone rubber systems, the preferred foam composition for the practice of the present invention comprises the various polyurethane foams. Such polyurethane foams are well known in the art and examples of same are disclosed by the aforementioned Patrick U.S. Pat. No. 3,772,113, the entire disclosure of which is herewith incorporated by reference thereto. An example of a suitable polyurethane foam system comprises the mixing and dispensing of two Freon-saturated polyurethane components, polyol and isocyanate. As more clearly depicted in FIG. 3, if a binary fluid polyurethane foam system is utilized in the practice of the present invention, sponge body 71 is substantially filled throughout its interconnected cell structure with the foam which is effectively and progressively being cured in situ as indicated at 84, thereby forming a foam composite body having two expanded portions 84a and 84b disposed within the interior and on the exterior sides of container wall section 65. This double expanded configuration results in a structural bridge and therefore a secure plug seal.

Figure 4:
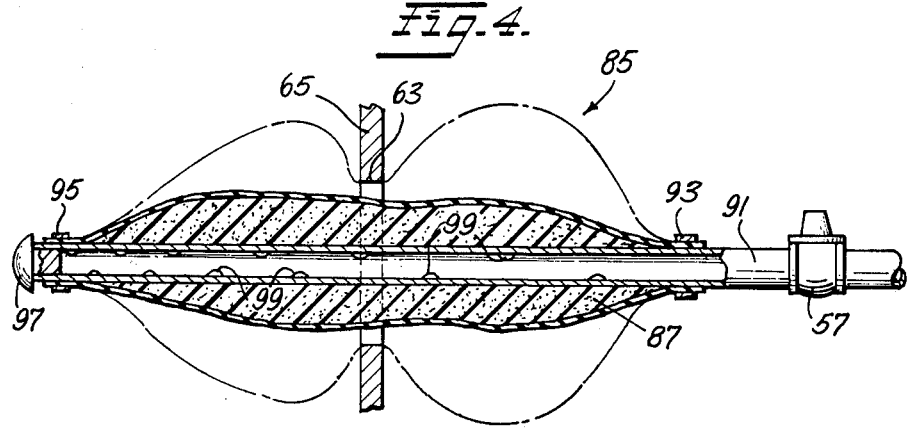
FIG. 4 is a partial cross-sectional view of another embodiment of the applicator of the present invention.

FIG. 4 is an alternative embodiment of the applicator as disclosed in FIGS. 2 and 3. In this case, the applicator 85 includes a slightly compressed open-celled sponge body 87 which is surrounded and enclosed by means of an expandable and impermeable rubber sleeve 89. The ends of the sleeve are secured to the core member 91 by means of clamps 93 and 95. The end of core member 91 may be closed by means of a permanent or removable plug 97. In this embodiment, sealant material fed into core member 91 is passed through perforations 99 in the wall thereof and injected into the interconnected cell structure of sponge body 87. As sponge body 87 fills with the sealant material, it expands and stretches rubber sleeve 89 until the periphery of rupture 63 is tightly sealed against any further leakage of fluid stored within the container in the same basic manner as previously described for the embodiment depicted by FIGS. 1 and 2.

It is to be understood that all components of system 1, such as valves, pressure regulators, quick disconnect couplings and feed lines, may be any such components well known in the prior art and deemed suitable for the respective functions required in the practice of the present invention.

BASIC MODE OF OPERATION

The basic preferred operation of system 1 for the sealing and repairing of a leak in a container wall 65 resulting from a rupture hole 63 is as follows: Feeder hoses 41 and 43 are connected to the quick disconnect couplings 37 and 39 such that the individual components of a binary fluid foam system may be individually fed into lines 33 and 35. As the individual fluids fill the lower portions of compartments 19 and 21 of cylinder 23, pistons 27 and 29 are simultaneously moved upwardly through common piston rod 31. The applicator 55 is inserted into the rupture hole 63 of container wall 65. The pressure regulator 9 is adjusted and on-off valve 7 is opened to permit a source of fluid pressure from compressed gas source 3 to fill line 5 which in turn travels to line 11 and, if necessary, may be vented to some degree through vent valve 13. The pressurized gas source in line 11 then splits off into separate feed lines 15 and 17 and enter the upper portions of separate compartments 19 and 21, respectively, of cylinder 23. This pressure then causes pistons 27 and 29 to be simultaneously actuated downwardly through common piston rod 31 such that the individual components of the binary fluid system are displaced and sent out lines 33 and 35. Pressure relief valves 44 and 45, already preset at a given value, permit the passage of fluid components in lines 33 and 35. thereacross only when the desired pressure value has been achieved. The displaced fluid components are then sent to a static mixer 51 which serves to intimately and homogeneously mix the two interacting components for the ultimate foaming reaction. The mixed fluids are then sent through one-way valve 57 to the applicator through line 53. After the foam composition enters core member 67, it is forced through the individual perforations 69 formed in the wall of core member 67 and injected into the interconnected open cells of the sponge body 71, thereby expanding the latter tightly against the periphery of rupture hole 63. The applicator 55 may be either evacuated by vacuum means (not shown) or a small vent line 78 may be dispersed within covering layer 73 to permit evacuation of trapped gases as indicated in FIG. 2. The expansion of spong body 71 is permitted by virtue of the expandible nature of outer covering layer 73 which, in the case of a silicone rubber coating, forms pores as it expands to permit trapped air in the foam to escape outwardly. The injection of the foam sealant composition is continued until the sponge body member is tightly and securely fitted against the periphery of the rupture hole 63 and the portions of the sponge body on either side thereof expands in a double configuration manner as clearly evidenced at 84a and 84b in FIG. 3. Flow of sealant material to the core member 67 is terminated by operation of one-way valve 57 once the secure sealing of leaking fluid from rupture hole 63 is achieved. The foam composition injected into the cells of sponge body 71 cures very quickly, thereby forming a foam composite with the sponge body and providing an extremely secure and tight seal of rupture hole 63 against any further leaking therethrough. Line 53 may then be disconnected from applicator 55 by means of quick disconnect coupling 59. The entire system may then be cleaned of foam composition residue by utilizing purge 61 which may utilize a source of any suitable solvent or cleaning liquid deemed suitable for effecting this procedure.

It is to be understood that the forms of the invention herewith shown and described are to be taken as preferred examples of the same and that various changes in the shape, size and arrangement of parts may be resorted to without departing from the spirit of the invention or scope of the sub-joined claims.

What is claimed is:

1. An applicator for use in sealing and repairing a rupture in a container wall with plastic foam material wherein said applicator comprises:
    a. a tubular core member provided with a plurality of perforations in the wall thereof,
    b. an open-celled sponge body surrounding the core member and communicating with the interior thereof through the perforations for receiving plastic foam material injected into the core member, and
    c. a porous expandable outer covering layer surrounding the sponge body, which covering layer:
        i. releases fluid pressure created when the sponge body is filled with the plastic foam material, and
        ii. permits the sponge body to expand radially on either side of the container wall to thereby seal the rupture.

2. The applicator of claim 1 further including a valve means secured to the core member for controlling the injection of plastic foam into the core member and through the perforations into the sponge body.

3. The applicator of claim 1 wherein the expandible outer covering layer is a coating of silicone rubber.

4. The applicator of claim 1 wherein the expandible outer covering layer is a rubber sleeve.

* * * * *